United States Patent
Miller et al.

[11] Patent Number: 5,947,626
[45] Date of Patent: Sep. 7, 1999

[54] FRICTIONAL REVOLVING JOINT

[75] Inventors: Wolfgang Miller, Wetter; Udo Schäfer, Witten; Harry Oppenländer, Wetter, all of Germany

[73] Assignee: Schafer GmbH Technik fur Antrieb und Steuerung, Wetter, Germany

[21] Appl. No.: 08/894,012

[22] PCT Filed: Jan. 31, 1996

[86] PCT No.: PCT/EP96/00387

§ 371 Date: Aug. 8, 1997

§ 102(e) Date: Aug. 8, 1997

[87] PCT Pub. No.: WO96/24780

PCT Pub. Date: Aug. 15, 1996

[30] Foreign Application Priority Data

Feb. 9, 1995 [DE] Germany ............ 195 04 145

[51] Int. Cl.[6] .................. F16D 1/00; F16L 17/00; F16L 29/00
[52] U.S. Cl. .................. 403/31; 403/374.1; 403/374.2
[58] Field of Search .................. 403/31, 365, 367, 403/368, 371, 374.1, 374.2

[56] References Cited

U.S. PATENT DOCUMENTS

| 3,009,747 | 11/1961 | Pitzer | 403/371 X |
| 4,425,050 | 1/1984 | Durand | 403/31 X |
| 4,630,690 | 12/1986 | Beasley et al. | 403/371 X |
| 4,824,277 | 4/1989 | Adolfsson | 403/368 X |

*Primary Examiner*—Lynne A. Reichard
*Assistant Examiner*—John R. Cottingham
*Attorney, Agent, or Firm*—Snell & Wilmer L.L.P.

[57] ABSTRACT

A frictional revolving joint for joining a hub to a shaft has a tapered ring arrangement with two tapered ring sections with conical outer surfaces that have a V-shaped cross-section and a clamping ring made of two clamping ring elements that enclose the tapered ring arrangement.

The ring shaped pressure chamber formed by the front surfaces of both clamping ring elements may be put under pressure by a hydraulic fluid, causing the clamping ring elements to slide outwards on the V-shaped tapered ring sections.

The ring-shaped pressure chamber (57) is sealed itself by sealing rings (55a, 55b,; 63) that engage the clamping ring elements (53a, 53b) in all positions of the latter. The ring-shaped pressure chamber (57) is thus hermetically sealed and hydraulic fluid cannot escape outwards.

9 Claims, 2 Drawing Sheets

FRICTIONAL REVOLVING JOINT

CROSS-REFERENCE TO RELATED MATERIALS

This application claims priority from PCT Application PCT/EP96/00387, filed Jan. 31, 1996, which claims priority from German Patent Application No. 195 04 145.3, filed Feb. 9, 1995.

TECHNICAL FIELD a tapered ring arrangement mountable on a shaft and to be fixed thereto, which comprises two tapered ring sections with conical outer surfaces cross-sectionally arranged in a V-shape, a clamping ring surrounding the tapered ring arrangement and which comprises two clamping ring elements with conical inner surfaces, which slide on the conical outer surfaces of the tapered ring sections, a ring-shaped pressure chamber formed between the inner front surfaces of the clamping ring elements, a ring-shaped element sealing the radial outside of the ring-shaped pressure chamber, at least one sealing ring being provided for sealing the ring-shaped pressure chamber between at least one of the circumferential surfaces of the clamping ring elements and the ring-shaped element, a seal of the ring-shaped pressure chamber with respect to the shaft and the inner surface of the tapered ring arrangement, a hydraulic connection of the ring-shaped pressure chamber and sealing rings are provided for sealing the ring-shaped pressure chamber, which in each position of the clamping ring elements are in engagement therewith.

Numerous different embodiments of such frictional revolving joints are known for joining a sleeve to a shaft in the form of couplings.

BACKGROUND AND TECHNICAL PROBLEMS

German patent 31 49 067 discloses a frictional revolving joint of the aforementioned type for a sleeve on a shaft.

The ring-shaped pressure chamber referred to as the pressure chamber is bounded on the side directed towards the shaft by the tapered ring arrangement and on the side directed out-wards from the shaft by a ring-shaped called a ring-shaped shoulder. The tapered ring arrangement comprises two tapered ring sections referred to as pressure rings and a sleeve. In the known frictional revolving joint, the ring-shaped element and a clamping ring element called the outer ring form a one-piece part and its outer end forming the ring-shaped element surrounds the ring-shaped pressure chamber end directed away from the shaft.

The tapered ring sections are screwed together and in the aforementioned manner together form the tapered ring.

The outer end of one clamping ring element engaging over the ring-shaped pressure chamber is displaceably mounted on the circumferential surface of the other clamping ring element. For sealing the ring-shaped pressure chamber, between the circumferential surface of one clamping ring element and the inner surface of the other clamping ring element engaging over the ring-shaped pressure chamber is provided a sealing ring.

The two clamping ring elements form the clamping ring surrounding the tapered ring sections.

The ring-shaped pressure chamber can be directly supplied with hydraulic fluid by means of a hydraulic connection and at least one duct.

For sealing the ring-shaped pressure chamber with respect to a sleeve or shaft, a sealing ring is provided at the junction point of the two tapered ring sections.

The known coupling functions as follows. By means of the hydraulic connection and the duct fluid-connected thereto, the ring-shaped pressure chamber is supplied with hydraulic fluid. As a result of the hydraulic fluid, the two clamping ring elements move simultaneously against the rising conical outer surfaces of the tapered ring sections. The consequence of this is that the tapered ring sections are pressed against the sleeve and the latter is in turn pressed against the shaft. Thus, a frictional connection is formed between the shaft and the sleeve. There is also a mechanical securing of the braced position.

As a result of the provision of sealing rings, the ring-shaped pressure chamber is not hermetically sealed. Hydraulic fluid penetrates between the conical outer surfaces of the tapered ring sections and the conical inner surfaces of the clamping ring elements. As a result, in the case of high operating pressures, larger hydraulic fluid quantities migrate along the conical outer surfaces of the tapered ring sections and can therefore escape outwards.

It is disadvantageous that the pressure in the ring-shaped pressure chamber necessary for the clamping of the tapered ring sections cannot be increased over and beyond a certain amount, because in the case of particularly high operating pressures hydraulic fluid escapes outwards to a greater extent and consequently limits the pressure.

In addition, the known frictional revolving joints are expensive as regards maintenance, because firstly the hydraulic fluid in the pressure system must be constantly monitored and optionally topped up and secondly it must be ensured that the surfaces between the inside of the sleeve or between the insides of the tapered ring sections and the outside of the shaft remain free from hydraulic fluid, so that it is ensured that there is a frictional grip between the shaft and the sleeve or the inside of the tapered ring sections in operation.

The problem therefore exists of so further developing a frictional revolving joint of the aforementioned type that, whilst avoiding the indicated disadvantages of the prior art for each application, there is a reliable clamping of the revolving joint to the shaft even in the case of high operating pressures in the ring-shaped pressure chamber. It is also preferable to avoid hydraulic fluid passing outside the frictional revolving joint and particularly into the space between the shaft and the inner surface of the tapered ring arrangement.

SUMMARY OF THE INVENTION

According to the invention this problem is solved in that:

the tapered ring arrangement has tapered ring sections, which also have conical outer surfaces, cross-sectionally arranged in a V-shape, the tapered ring arrangement being subdivided into at least two axial segments and the tapered ring sections are in one piece, and the sealing rings provided between the conical outer surfaces of the tapered ring sections and the conical inner surfaces of the clamping ring elements are positioned directly alongside the ring-shaped pressure chamber.

Therefore the frictional revolving joint has the decisive advantage that, as a result of the arrangement of the sealing rings, the ring-shaped pressure chamber is completely sealed against its environment and consequently possible leakage losses are avoided.

Another advantage of the inventive frictional revolving joint is that the operating pressure selectable in the ring-shaped pressure chamber can be made significantly higher than the maximum pressure in the ring-shaped pressure chamber of the prior art revolving joint. Thus, a reliable clamping connection to a torque acting on the shaft up to at least 1,500 Nm is possible.

According to an advantageous further development of the invention, between the tapered ring sections and the shaft is provided a sleeve, which together with the tapered ring sections forms the tapered ring arrangement. This sleeve is preferably circumferentially multiply axially subdivided. Advantageously the sleeve is in three parts. The individual sleeve elements in the relieved state have gaps in the form of slots. This leads to an optimum transfer of the clamping force brought about by the displacement of the clamping ring elements to the shaft.

In addition, an intermediate ring element is provided, which is positioned between the tapered ring sections and is designed in such a way that in any possible position of the clamping ring elements with respect to the shaft, the ring-shaped pressure chamber is bounded and sealed.

Another further development of the inventive revolving joint leads to a much easier fitting compared with the prior art, because the sealing rings necessary for sealing the ring-shaped pressure chamber relative to the conical outer surfaces of the tapered ring sections are already inserted in seats provided in the intermediate ring element prior to the mounting of the latter on the tapered ring sections.

This also obviates any need for a further working of the conical outer surfaces of the tapered ring sections or the conical inner surfaces of the clamping ring elements, which would fundamentally be necessary on including the sealing rings in the conical surfaces.

Another, cost-saving advantage is that through the arrangement of the sealing rings on the intermediate ring element it is possible with a single component to bring about both a sealing of the ring-shaped pressure chamber with respect to the conical outer surfaces of the tapered ring sections and a sealing with respect to the shaft and the inner surfaces of the tapered ring sections.

According to the invention, the tapered ring arrangement comprises solely two tapered ring sections, which have conical outer surfaces cross-sectionally arranged in a V-shape. The two tapered ring sections are in one piece and are subdivided into at least two and preferably three axial segments.

Advantageously, a ring-shaped element outwardly bounding the ring-shaped pressure chambers is a one-piece part with a clamping ring element. As a result of this arrangement, only a single sealing ring is required, in order to seal to the outside the ring-shaped pressure chamber on the side directed away from the shaft.

At least one retaining screw provided in one of the clamping ring elements maintains the braced position of the tapered ring sections, so that it is unnecessary for permanently providing a frictional joint to permanently supply the ring-shaped pressure chamber with hydraulic fluid under operating pressure.

Preferably, use is made of six retaining screws arranged at mutual angular distances of 60° on the front of the clamping ring elements directed away from the ring-shaped pressure chamber.

Hydraulic pressurisation according to the principle of a single-acting hydraulic cylinder is possible because the inclination of the conical outer surfaces of the tapered ring sections is preferably chosen in such a way that the inclination angle of the particular conical tapered ring element is slightly larger than the angle of friction of two well machined and lubricated metal surfaces sliding on one another.

Further advantageous developments of the invention can be gathered from the subclaims and description.

BRIEF DESCRIPTION OF THE DRAWING FIGURES

The invention is described in greater detail hereinafter relative to an embodiment and the attached drawings, wherein show:

FIG. 1 A cross-section through a frictional revolving joint mounted on a shaft, the ring-shaped pressure chamber being pressureless and the clamping ring elements being in the relieved state.

FIG. 2 A cross-section through the frictional revolving joint of FIG. 1, but with a pressurized ring-shaped pressure chamber and clamping ring elements in the clamped position, where they are additionally held in the clamped position by means of a retaining screw.

DETAILED DESCRIPTION OF THE PREFERRED EMBODIMENTS

Figure 1:
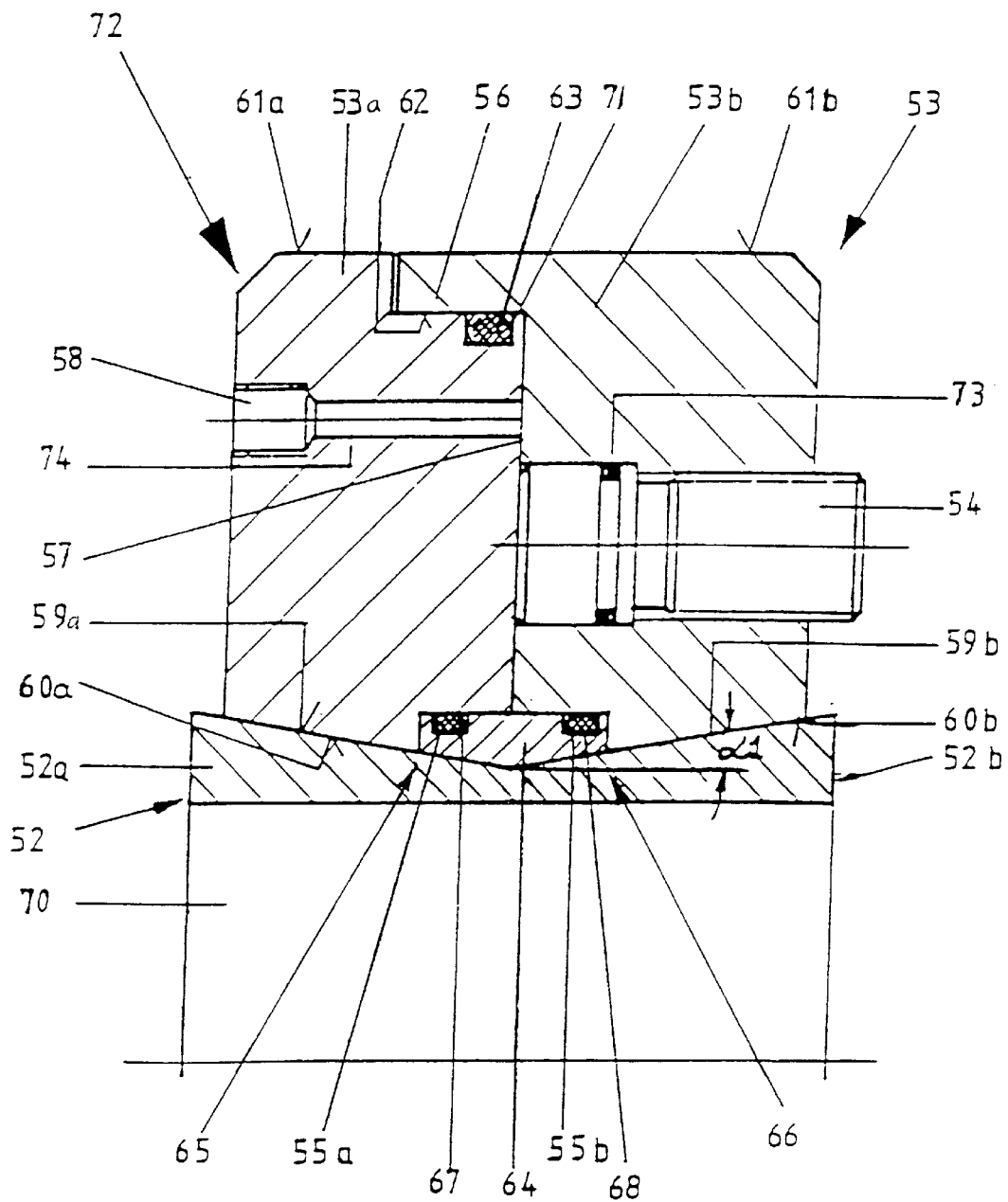

FIG. 1 shows a cross-section of a frictional revolving joint 72, which essentially comprises two elements, namely a multiply circumferentially axially subdivided tapered ring arrangement 52 which can be mounted on a shaft 70 and a clamping ring 53 surrounding the tapered ring arrangement 52. The tapered ring arrangement 52, in this embodiment (FIGS. 1 and 2) comprises the tapered ring sections 52a, 52b surrounding the shaft 70 and having conical outer surfaces 59a, 59b cross-sectionally arranged in a V-shape and are constructed in one-piece. As a result of the one-piece nature of the tapered ring sections 52a, 52b, it is possible to displace the tapered ring arrangement 52 in the direction of the longitudinal extension of the shaft 70 only together with the clamping ring 53.

The clamping ring 53 surrounding the tapered ring arrange-ment 52 also comprises two clamping ring elements 53a, 53b which are preferably identical as regards their basic shape. The clamping ring elements 53a, 53b have conical inner surfaces 60a, 60b, which slide on the conical outer surfaces 59a, 59b of the tapered ring sections 52a, 52b.

As a result of the arrangement of the clamping ring elements 53a, 53b between the inner front faces of the particular clamping ring element 53a, 53b a ring-shaped pressure chamber 57 is formed, which is spatially bounded towards the shaft 70 by the tapered ring arrangement 52 and on the side directed away from the shaft 70 by a ring-shaped element 56.

The ring-shaped pressure chamber 57 is fluid-connected by means of at least one pressure line 74 provided in a clamping ring element 53a, 53b or in the ring-shaped element 56 to a hydraulic connection 58.

The ring-shaped element 56 is preferably constructed as an outer ring and surrounds at least part of the circumferential surface 61a, 61b of the clamping ring 53 with its inner surface 62.

Figure 2:
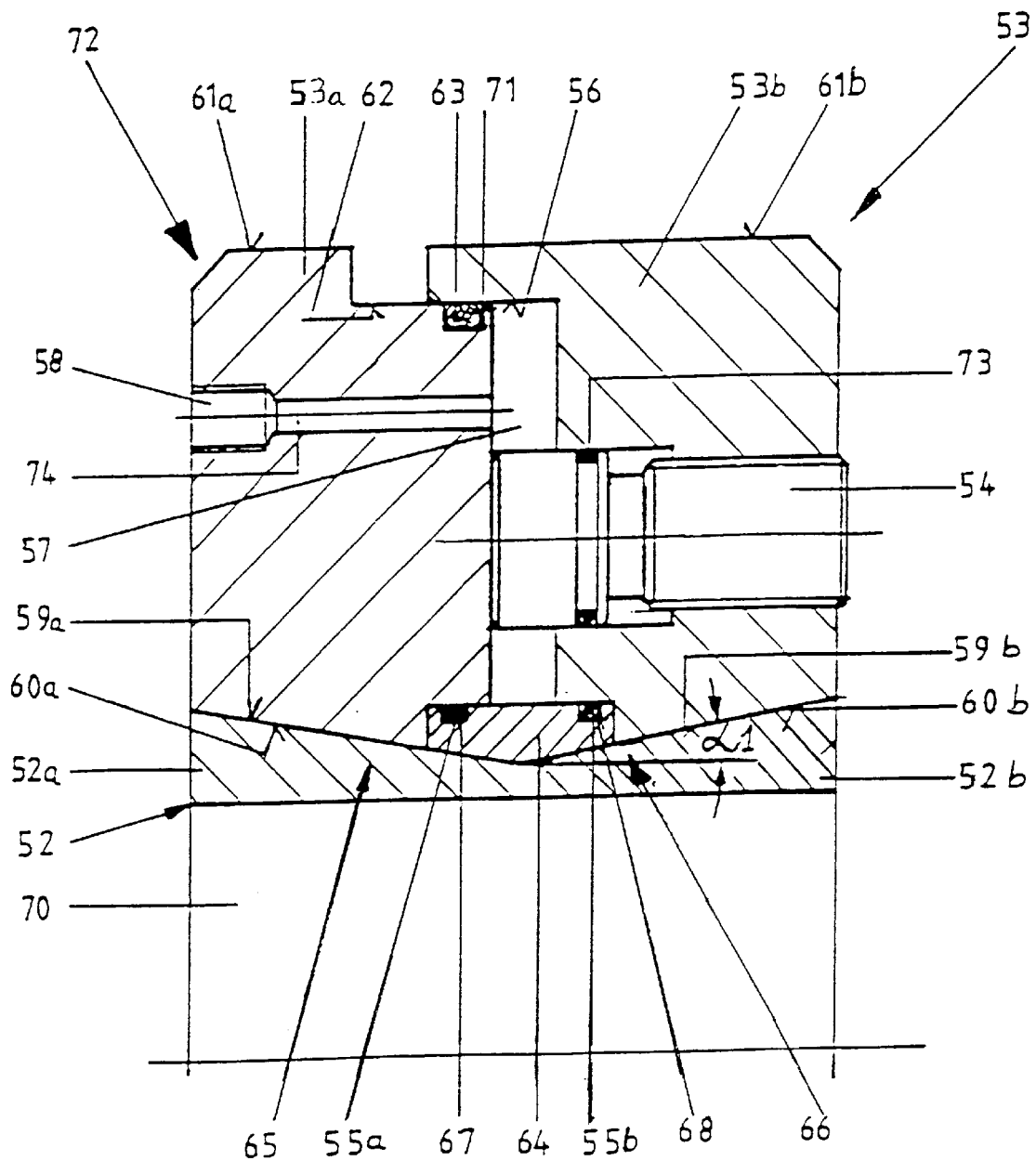

In the embodiment shown in FIGS. 1 and 2 the ring-shaped element 56 is connected in one piece with one of the clamping ring elements 53a, 53b and is so designed that it engages over the other clamping ring element and consequently bounds the ring-shaped pressure chamber 56 on the side directed away from the shaft 70. The sealing ring 63 for sealing the ring-shaped pressure chamber 57 is preferably positioned directly alongside the ring-shaped pressure chamber 57 in a recess 71 in one of the clamping ring elements 53a, 53b.

There is also an intermediate ring element 64, which is so positioned and designed on one of the outer surfaces of the tapered ring sections 52a, 52b in the base of the V-shaped tapered ring arrangement 52, that the ring-shaped pressure chamber 57 is bounded and sealed with respect to the shaft 70 and the conical outer surfaces 59a, 59b of the tapered ring sections 52a, 52b in any position of the clamping ring elements 53a, 53b.

This is brought about in that the intermediate ring element 64 has on its two outer ends 65, 66 recesses 67, 68 for receiving sealing rings 55a, 55b. The recesses 67, 68 for the sealing rings 55a, 55b are so positioned and designed that the sealing rings 55a, 55b in each position of the clamping ring elements 53a, 53b are in engagement with the inner surfaces 60a, 60b of the latter.

On reaching the desired clamping position (FIG. 2), for securing and arresting the clamped position at least one retaining screw 54 retained by a clamping ring element 53b is provided.

In the preferred embodiment of the present invention, the number of retaining screws 54 is dependent on the clamping force necessary for maintaining the clamped position.

Each retaining screw 54 has a sealing ring 73 for sealing the ring-shaped pressure chamber 57 with respect to the thread of the retaining screw 54 held in the clamping ring element 53b.

Following the securing of the clamped position by the retaining screw or screws 54, the ring-shaped pressure chamber 57 can be made pressureless without releasing the frictional revolving joint from the shaft 70.

Each of the described embodiments permits a hermetic sealing of the ring-shaped pressure chamber 57 and consequently a secure and reliable clamping under very high clamping forces.

We claim:

1. A frictional revolving joint comprising:
   a tapered ring arrangement mountable on a shaft and fixed thereto comprising two tapered ring sections with conical outer surfaces cross-sectionally arranged in a V-shape,
   a clamping ring surrounding said tapered ring arrangement and which comprises two clamping ring elements with conical inner surfaces, which slide on said conical outer surfaces of said tapered ring sections,
   a ring-shaped pressure chamber formed by and between said inner front surfaces of said clamping ring elements,
   a ring-shaped element sealing a radial outside of said ring-shaped pressure chamber in which for sealing said ring-shaped pressure chamber at least one sealing ring is provided between at least one of circumferential surfaces of said clamping ring elements and said ring-shaped element,
   a seal of said ring-shaped pressure chamber relative to said shaft and said inner surface of said tapered ring arrangement
   a hydraulic connection of said ring-shaped pressure chamber,
   a plurality of sealing rings for sealing said ring-shaped pressure chamber relative to said shaft, which in each position of said clamping ring elements are in engagement therewith, in which said sealing rings provided between said conical outer surfaces of said tapered ring sections and said conical inner surfaces of said clamping ring elements are positioned directly alongside said ring-shaped pressure chamber,
   characterized in that
      said tapered ring arrangement is subdivided into at least two axial segments and said tapered ring sections of said segments are designed in one piece, and
      an intermediate ring element is provided, which is so positioned between or on said tapered ring sections and is so designed that said ring-shaped pressure chamber in each position of said clamping ring elements is bounded and sealed with respect to said shaft.

2. A revolving joint according to claim 1, characterized in that said at least one sealing ring provided between at least one of said circumferential surfaces of said clamping ring elements and said ring-shaped element is provided directly alongside said ring-shaped pressure chamber.

3. A revolving joint according to claim 1, characterized in that said intermediate ring element has in the vicinity of two outer ends (65, 66) of said intermediate ring element, a plurality of recesses for receiving said sealing rings.

4. A revolving joint according to claim 1, characterized in that said ring-shaped element surrounding said clamping ring is constructed as an outer ring.

5. A revolving joint according to claim 2, characterized in that said at least one sealing ring is located in a recess in one of said clamping ring elements.

6. A revolving joint according to claim 1, characterized in that said clamping ring elements can be secured in the clamped position by means of at least one retaining screw retained in said clamping ring element.

7. A revolving joint according to claim 6, characterized in that a retaining screw sealing ring surrounding said retaining screw is provided for sealing said ring-shaped pressure chamber relative to a thread of said retaining screw held in said clamping ring element.

8. A revolving joint according to claim 1, characterized in that the inclination of said conical outer surfaces of said tapered ring sections is so chosen that an angle ( 1) formed with a center axis of said shaft is greater than 7°.

9. A revolving joint according to claim 1, characterized in that said sealing rings are O-rings.

* * * * *